United States Patent
Miyamoto

(10) Patent No.: US 10,118,237 B2
(45) Date of Patent: Nov. 6, 2018

(54) END MILL AND SCROLL FOR SCROLL COMPRESSOR

(71) Applicant: Mitsubishi Electric Corporation, Tokyo (JP)

(72) Inventor: Yusaku Miyamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 253 days.

(21) Appl. No.: 15/028,740

(22) PCT Filed: Jan. 7, 2014

(86) PCT No.: PCT/JP2014/000018
§ 371 (c)(1),
(2) Date: Apr. 12, 2016

(87) PCT Pub. No.: WO2015/104732
PCT Pub. Date: Jul. 16, 2015

(65) Prior Publication Data
US 2016/0256939 A1   Sep. 8, 2016

(51) Int. Cl.
*B23C 5/10* (2006.01)
*B23C 3/18* (2006.01)

(52) U.S. Cl.
CPC ............ *B23C 5/10* (2013.01); *B23C 3/18* (2013.01); *B23C 2210/04* (2013.01); *B23C 2210/20* (2013.01); *B23C 2210/321* (2013.01)

(58) Field of Classification Search
CPC ...... B23B 2200/0447; B23B 2200/087; B23B 2226/31; B23B 27/143; B23B 27/20;
(Continued)

(56) References Cited

U.S. PATENT DOCUMENTS 4,212,568 A * 7/1980 Minicozzi ............... B23C 5/10
407/53
4,744,705 A * 5/1988 Imanaga ............... B23B 51/02
408/145
(Continued)

FOREIGN PATENT DOCUMENTS

EP   2067552 A1 * 6/2009 ............ B23B 27/141
JP   45-31225 B1   10/1970
(Continued)

OTHER PUBLICATIONS

International Search Report of the International Searching Authority dated Feb. 4, 2014 for the corresponding international application No. PCT/JP2014/000018 (and English translation).

*Primary Examiner* — Sara Addisu
(74) *Attorney, Agent, or Firm* — Posz Law Group, PLC

(57) ABSTRACT

In an end mill, a peripheral cutting edge portion has a peripheral cutting edge formed in a spiral shape around an axis, a peripheral rake face formed on the front side of the peripheral cutting edge in the rotating direction and bordering thereon and a peripheral flank formed on the rear side of the peripheral cutting edge in the rotating direction and bordering thereon. The peripheral flank has a first peripheral flank formed in a position on the mill body tip side to have a first clearance angle and a second peripheral flank formed in a position on the mill body end side of the first peripheral flank and neighboring the first peripheral flank to have a second clearance angle. An average width value of the first peripheral flank in the rotating direction is greater than an average width value of the second peripheral flank in the rotating direction.

6 Claims, 4 Drawing Sheets

(58) Field of Classification Search
CPC ............... B23B 27/22; B23C 2210/20; B23C 2210/201–2210/209; B23C 2210/04; B23C 3/18; B23C 5/10
See application file for complete search history.

(56) References Cited

U.S. PATENT DOCUMENTS

| | | | | |
|---|---|---|---|---|
| 5,049,009 | A * | 9/1991 | Beck | B23C 5/10 407/34 |
| 5,725,333 | A * | 3/1998 | Abe | B23C 5/1081 407/118 |
| 5,779,399 | A * | 7/1998 | Kuberski | B23C 5/10 407/54 |
| 6,846,135 | B2 * | 1/2005 | Kuroda | B23C 5/10 407/34 |
| 6,953,310 | B2 * | 10/2005 | Iwamoto | B23C 5/1009 407/119 |
| 7,186,063 | B2 * | 3/2007 | Volokh | B23C 5/10 407/53 |
| 2002/0031409 | A1 * | 3/2002 | Sato | B23C 5/10 407/53 |
| 2002/0067964 | A1 * | 6/2002 | Sekiguchi | B23C 5/10 407/63 |
| 2005/0105973 | A1 * | 5/2005 | MacArthur | B23C 5/10 407/53 |
| 2006/0045637 | A1 * | 3/2006 | Flynn | B23C 5/10 407/53 |
| 2006/0045638 | A1 * | 3/2006 | Flynn | B23C 5/10 407/53 |
| 2006/0067797 | A1 * | 3/2006 | Calamia | B23C 5/10 407/53 |

FOREIGN PATENT DOCUMENTS

| | | | |
|---|---|---|---|
| JP | H03-117522 U | 12/1991 | |
| JP | 11058120 A * | 3/1999 | ............... B23C 5/10 |
| JP | 2011-287114 A | 10/2001 | |
| JP | 2004141975 A * | 5/2004 | |
| JP | 2006015418 A * | 1/2006 | |
| JP | 2011-020248 A | 2/2011 | |
| JP | 2011-045959 A | 3/2011 | |

* cited by examiner

CROSS SECTION F-F (EXAMPLE 2)

CROSS SECTION G-G (EXAMPLE 2)

END MILL AND SCROLL FOR SCROLL COMPRESSOR

CROSS REFERENCE TO RELATED APPLICATIONS

This application is a U.S. national stage application of PCT/JP2014/000018 filed on Jan. 7, 2014, the contents of which are incorporated herein by reference.

TECHNICAL FIELD

The present invention relates to improvement of end mills (hereinafter may be called tools) for cutting work on side surfaces of work materials and scrolls processed by end mills for scroll compressors.

BACKGROUND

FIGS. 5 to 7 show an example of a conventional commonly-used end mill. FIG. 5 shows an external appearance of the end mill. FIG. 6 shows an aspect during cutting work by the conventional end mill. FIG. 7 shows a cross-sectional shape of a worked surface of a work material formed by cutting work of the conventional end mill.

The end mill 500 illustrated in FIGS. 5 to 7 has a shank 108 on the end side of a mill body 105 and six spiral peripheral cutting edges 103 formed on the tip side. A peripheral rake face 101 is formed on the front side of each peripheral cutting edge 103 in the rotating direction R and a peripheral flank 106A is formed on the rear side of each peripheral cutting edge 103 in the rotating direction R. The typical usage manner of this end mill 500 is to allow the end mill 500 to remove part of a work material P to obtain a target shape by traveling along a side surface of the work material P while rotating (direction of arrow R) and giving a predetermined cutting to the work material P. At the time of such cutting work, since an undulation of the worked surface is caused by an elastic deformation of the end mill 500, such cutting work results in an accuracy defect for cutting work requiring a high-precision flatness and straightness in the axial direction.

Hereinafter an elastic deformation of the end mill and an undulation of the worked surface will be described. A commonly-used end mill 500 shown in FIG. 5 has spiral peripheral cutting edges 103 on the outer circumferential surface of a cylindrical mill body 105 and radial cutting edges on the tip of the mill body 105. This end mill 500 has a function of removal processing on the side surface and the bottom surface of the work material simultaneously by coming in contact with the work material while rotating. Since the end mill 500 overhangs in a cantilever state due to the machining process of the end mill and thus receives a load (hereinafter, cutting resistance) during the removal processing to the work material P in the lateral direction, the end mill 500 causes its deflection. The plurality of peripheral cutting edges 103 of the end mill 500 are separated from each other in the axial direction. Hence, the number and location of the cutting points varies in accordance with the rotation phase, and thus the deflection of the end mill also changes.

Hereinafter, description will be made with reference to FIG. 6(b) in which six peripheral cutting edges 103 of the end mill 500 are developed on a plane. When the rotation phase of the end mill 500 is at the position A in FIG. 6(b), the end mill 500 and the work material are in contact with each other at three points (circle marked positions in FIG. 6(b)) and the contact positions are located on the tip side of the end mill 500. Next, when the end mill rotates to the position of rotation phase B, though the end mill 500 and the work material have three contact points, the contact positions are closer to the base (closer to the shank 108) of the end mill 500 and the deflection of the tool reduces. At the position of rotation phase C, the end mill 500 and the work material have two contact points, and since the contact positions become further closer to the base, the deflection further reduces. At the position of rotation phase D, the contact state becomes similar to the rotation phase A and the deflection increases. In reality, since the rotation speed of the end mill 500 is extremely high compared to its traveling speed in the horizontal direction, the phenomena of the above rotation phases A to D continuously appear on the cross section of the work material P in the axial direction V, resulting in an undulation on the worked surface M of the work material P as shown in FIG. 7 and an undulation height HA that is a difference between the highest position and the lowest position based on the axis V increases.

For cutting work requiring a high-precision flatness and straightness in the axial direction, the above-described undulation becomes a problem. Hence, to improve the straightness of the worked surface of a work material, proposed is a method in which the diameter of the tool is continuously varied in the axial direction to offset a predicted undulation based on previous prediction of the position and height of the undulation on the worked surface corresponding to the rotation phase of the end mill (for example, refer to Patent Literature 1).

PATENT LITERATURE

Patent Literature 1: Japanese Unexamined Patent Application Publication No. 2011-45959 (paragraphs in the description [0019] to [0031], FIGS. 1 to 3)

With regard to conventional end mills, the usage causes an abrasion of peripheral cutting edges to proceed to reduce the sharpness and increases cutting resistance. This brings a problem that an elastic deformation of the end mill increases and an undulation on the worked surface enlarges. To be specific, since in the process of a tool abrasion, the undulation height on the worked surface changes, the method in which the tool diameter is compensated in accordance with prediction of the undulation height at a certain point of time during the tool abrasion progress as described in the above Patent Literature 1 can suppress the undulation at this point of time but allows the undulation height to increase when the tool abrasion is in other states.

SUMMARY

The present invention is achieved to solve the problems described above and an object is to provide long-lived end mills that can lessen the undulation on the worked surface of the work material regardless of the progress level of the tool abrasion and maintain working accuracy for a long period.

The end mill relating to the present invention is an end mill having, a mill body to be rotated in a rotating direction around an axis and a plurality of peripheral cutting edge portions twisted around the axis and formed on a circumference of a tip side of the mill body. The plurality of peripheral cutting edge portions are composed of a peripheral cutting edge formed into a spiral shape around the axis, a peripheral rake face on a front of the peripheral cutting edge in the rotating direction and bordering on the peripheral cutting edge, and a peripheral flank formed on a rear side of the peripheral cutting edge in the rotating direction and bordering on the peripheral cutting edge. The peripheral flank is composed of a first peripheral flank extended from the tip side of the mill body to an end side of the mill body and a second peripheral flank formed in an area of a rear side on the first peripheral flank in the rotating direction and formed in a position of a rotation phase being common to each of the peripheral cutting edge portions.

Since the end mill according to the present invention has the peripheral flank composed of the first peripheral flank formed to have the first clearance angle and the second peripheral flank formed to have the second clearance angle greater than the first clearance angle, the tool abrasion progresses more rapidly on an area of the peripheral cutting edge portion having a small width of the flank than other areas of the peripheral cutting edge portion having a large width of the flank. The area having a small width of the flank corresponds to a recess portion of the undulation on the worked surface. Since the recess portion of the undulation on the worked surface and the reduction of the tool diameter from the end mill abrasion are offset by each other, the height of the undulation can be reduced and effects of enhancing the flatness of the worked surface and improving the appearance are brought about. Incidentally, the present invention is not one changing the diameter of the peripheral cutting edges namely the tool diameter in the axis direction like conventional arts are.

BRIEF DESCRIPTION OF DRAWINGS

FIG. 1 FIG. 1 is a diagram illustrating an end mill according to Embodiment 1 of the present invention in which FIG. 1(a) is a partial front view, FIG. 1(b) is a bottom view, FIG. 1(c) is a partial cross-sectional view taken along line F-F in FIG. 1(a), FIG. 1(d) is a partial front view of a partial cross-sectional view taken along line G-G in FIG. 1(a), FIG. 1(e) is an explanatory view taken along line F-F in FIG. 1(a) and illustrating an abrasion state and FIG. 1(f) is an explanatory view taken along line G-G in FIG. 1(a) and illustrating an abrasion state.

FIG.

FIG. FIG. 3 is a diagram illustrating an end mill according to Embodiment 2 of the present invention in which FIG. 3(a) is a partial cross-sectional view corresponding to FIG. 1(c), and FIG. 3(b) is a partial cross-sectional view corresponding to FIG. 1(d).

FIG.

FIG.

FIG. FIG. 6 is a diagram illustrating an aspect of cutting work by a conventional commonly-used end mill in which FIG. 6(a) is a front view, and FIG. 6(b) is a development diagram illustrating a state of peripheral cutting edges developed in the spindle circumferential direction.

DETAILED DESCRIPTION

Embodiment 1

Figure 1:
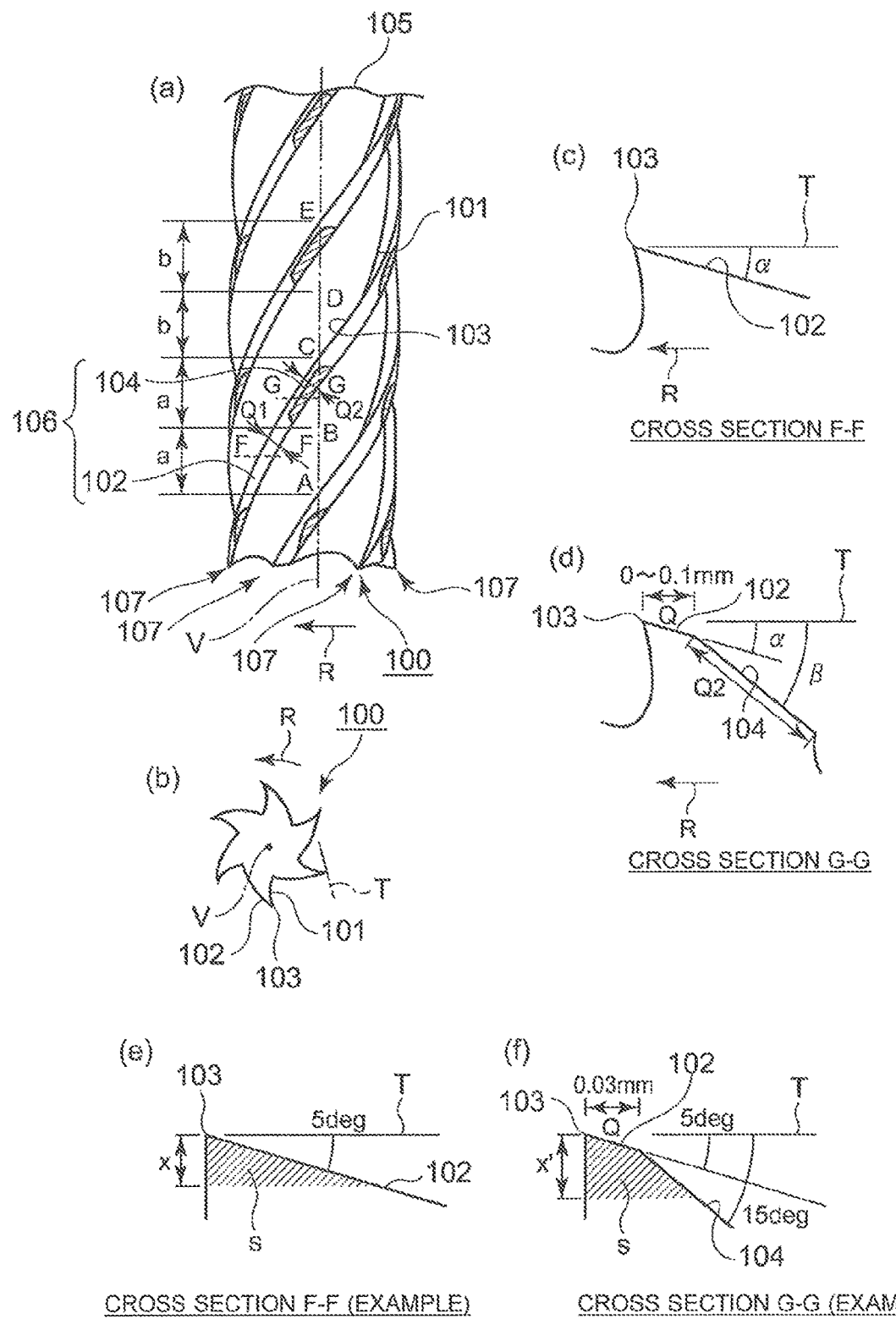

FIG. 1 illustrates a schematic configuration of an end mill according to Embodiment 1.

Figure 6:
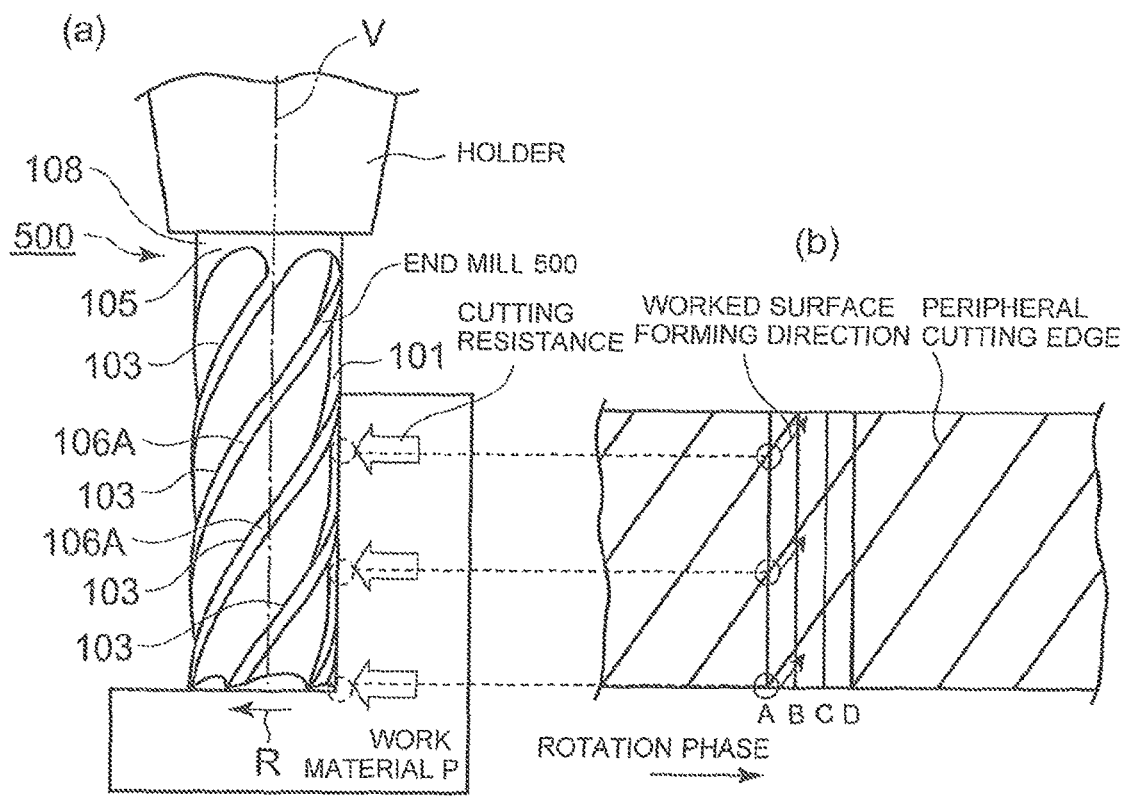

As shown in FIG. 1, an end mill 100 according to Embodiment 1 of the present invention is, for example, made of a cemented carbide (tungsten carbide steel) and six peripheral cutting edge portions 107 twisted around the axis V are formed on the tip side circumference of the mill body V rotating around the axis V. Each peripheral cutting edge portion 107 is composed of a peripheral cutting edge 103 formed in a spiral shape around axis V, a peripheral rake face 101 formed on the front side of the peripheral cutting edge 103 in the rotating direction R and bordering on the peripheral cutting edge 103, and a peripheral flank 106 formed on the rear side of the peripheral cutting edge 103 in the rotating direction R and bordering on the peripheral cutting edge 103. The end side of the mill 105, similar to the conventional arts, is formed of a shank 108 to be held by a holder (refer to FIG. 6(a)) of a rotary drive machine.

The above peripheral flank 106 is composed of a first peripheral flank 102 formed in a position on a tip side of the mill body 105 (the mill body 105 tip side) and a second peripheral flank 104 formed in a position on an end side of the mill body 105 (the mill body 105 end side) of the first peripheral flank 102 and neighboring the first peripheral flank 102. The first peripheral flank 104 may be referred to herein as a first part, and the second peripheral flank 104 may be referred to herein as a second part. The above second peripheral flank 104, as shown in FIG. 1(a), is formed only in the area B-C that is the base-side half of the area A-C of the end mill 100 in the axis V direction of the peripheral cutting edge 103. This second peripheral flank 104 is formed by grinding with a whetstone for example. As shown in the cross section F-F in FIG. 1(c), the first clearance angle α of the first peripheral flank 102 is smaller than the second clearance angle β of the second peripheral flank 104 shown in the cross section G-G in the FIG. 1(d). In this example, the clearance angle β is equal 2αa for example. To keep both the sharpness and the cutting edge strength of the end mill 100, each of the clearance angles α and β is preferably in the range 0-20 degrees.

The average value of the width Q1 of the first peripheral flank 102 in the rotating direction R over the peripheral cutting edge 103 in the helical direction is greater than the average value of the width Q2 of the second peripheral flank 104 in the rotating direction R over the peripheral cutting edge 103 in the length direction. The minimum value of the width Q in the rotating direction R of the first peripheral flank 102 located on the front side of the second peripheral flank 104 in the rotating direction R and neighboring the second peripheral flank 104 is over 0 mm and equal to or under 0.1 mm. In other words, the first peripheral flank 102 having a width Q is formed in the area neighboring the second peripheral flank 104 in the rotating direction R. On each peripheral cutting edge 103, the second peripheral flank 104 is formed in the position of a common rotation phase.

Next, the operation will be described.

Figure 2:
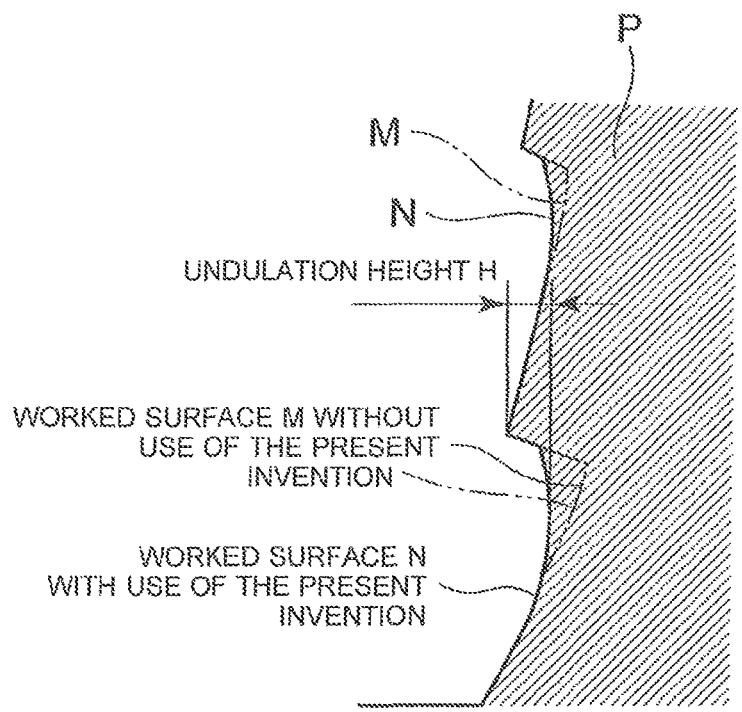
FIG. 2 is a partial cross-sectional view illustrating a cross section of a worked surface of a work material machined by an end mill according to Embodiment 1 of the present invention.
Figure 7:
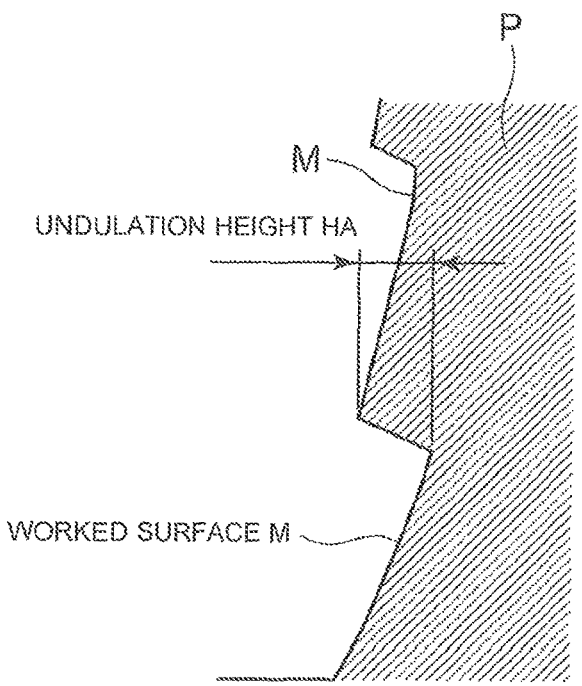
FIG. 7 FIG. 7 is a partial cross-sectional view illustrating a cross-sectional shape of a worked surface of a work material machined by a conventional commonly-used end mill.

The end mill 100 according to Embodiment 1 configured as described above is rotated by drive of a rotary drive machine with the chuck portion 108 held in a holder (refer to FIG. 6) of the rotary drive machine. The end mill 100 conducts cutting work by repeating its travel along a side of a work material P while giving a predetermined cutting to the work material P. That is, the area in which the second peripheral flank 104 is formed increases its abrasion progress speed after the first peripheral flank 102 underwent an abrasion over the entire width in the rotating direction in the process of the tool abrasion compared with areas where the second peripheral flank 104 is not formed, and the diameter of the tool in this area reduces. When further cutting work is added when the tool abrasion has progressed like this, the shape of the worked surface N of the work material P shown in FIG. 2 is obtained. The worked surface N obtained in such a manner is formed such that the undulation height H that is a difference between the distances to the peak of a projection and the bottom of a recess of the work material P from the axis is smaller than the undulation height HA (refer to FIG. 7) on a worked surface M obtained by a conventional art. Incidentally the existence of the second peripheral flank 104 brings a self-rectification effect to the undulation. That is, the worked surface N is formed while excessive removal is prevented on the portion where excessive removal is observed on the conventional worked surface M.

The details of the above-described aspect will be described further. FIGS. 1(e) and 1(f) illustrate approximate shapes of the cross section F-F in FIG. 1(c) and the cross section G-G in FIG. 1(d). Here, it is assumed that the first clearance angle α of the first peripheral flank 102 is 5 degrees, the second clearance angle β of the second peripheral flank 104 is 15 degrees, and the width Q of the first peripheral flank 102 in the rotating direction R is 0.03 mm. Though the tool abrasion progresses and the hatched parts in FIGS. 1(e) and 1(f) disappear while the cutting work continues, the influence of the flank shape to the lost volume of the end mill 100 is small and, as shown in FIGS. 1(e) and 1(f), the cross-sectional area S of the hatched part on the cross section F-F and the cross-sectional area S of the hatched part on the cross section G-G are the same. According to this property, the abrasion of the cross section G-G in the radial direction progresses more rapidly than that of the cross section F-F. For example, assuming that the abrasion height x on the cross section F-F in the radial direction is 0.01 mm, the abrasion height x' on the cross section G-G in the radial direction is 0.013 mm. Further, when the abrasion height x on the cross section F-F in the radial direction is 0.02 mm, the abrasion height x' on the cross section G-G in the radial direction is 0.03 mm.

The position in the axis V direction where the second peripheral flank 104 is formed corresponds to the position where a recess surface is formed on the worked surface at the time of use of a conventional end mill 500 and because of the tool diameter smaller than other areas, the depth of the recess surface reduces. That is, the obtained undulation height H is reduced.

Since the abrasion width of the first peripheral flank 102 in the rotating direction is commonly 0.1 mm or less, when the second peripheral flank 104 is formed, the width Q of the first peripheral flank 102 in the rotating direction R is preferably over 0 mm and equal to or under 0.1 mm.

As described above, the use of the end mill 100 according to Embodiment 1 reduces the undulation height H of the worked surface even when the tool abrasion has progressed. In this manner, when the undulation height H reduces, the flatness of the worked surface is enhanced as well as the appearance is improved. By virtue of this, when a scroll blade made of an aluminum to be used for a scroll compressor for an air-conditioning apparatus is subjected to cutting work for example, the leak of refrigerant gas between the scroll blades sliding on each other can be eliminated. Further, it enables a longer service life of the end mill for cutting work requiring a high precision flatness or straightness.

Embodiment 2

In Embodiment 1, a flat surface whose cross-sectional shape is a straight line is formed as each of the first peripheral flank and the second peripheral flank, and Embodiment 2 different from Embodiment 1 will be described next.

Figure 3:
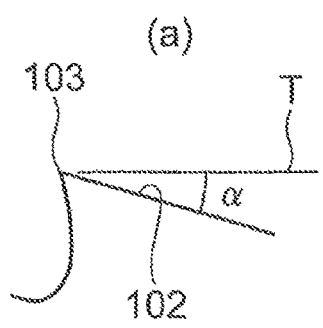
Figure 3:
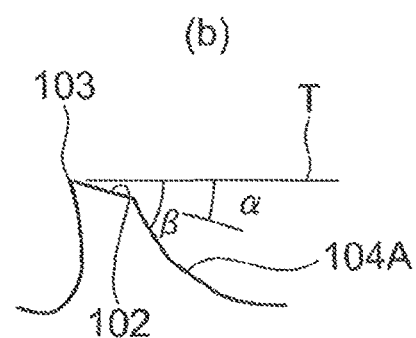

The end mill 100A according to Embodiment 2 has, as shown in FIG. 3, a first peripheral flank 102 and a second peripheral flank 104A. The cross-sectional shape of the second peripheral flank 104A viewed in the axis direction V is formed into a curved line concave toward the inside in the radial direction (refer to FIG. 3(b)).

The end mill 100A provided with the second peripheral flank 104A having such a concave curved surface can have a large second clearance angle β of the second peripheral flank 104A compared with a second peripheral flank 104 having a linear shape. Therefore, the undulation height of the worked surface can be reduced and a high precision flatness and straightness can be achieved.

Embodiment 3

Figure 4:
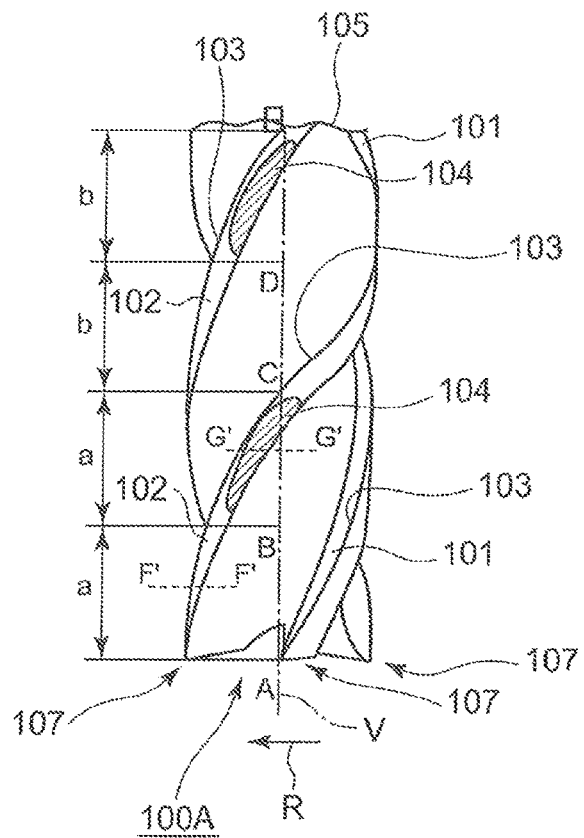
FIG. 4 is a partial front view illustrating an end mill according to Embodiment 3 of the present invention.
Figure 5:
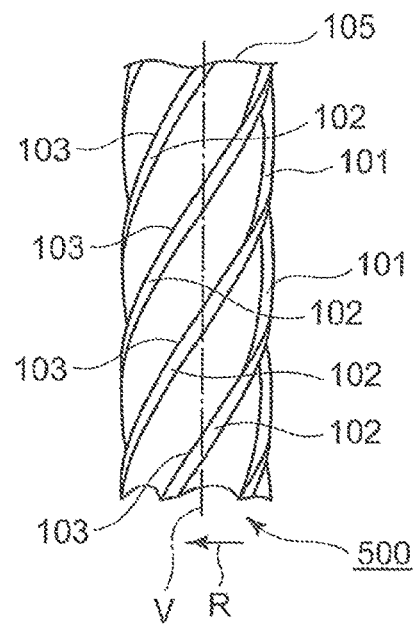
FIG. 5 is a partial front view illustrating a conventional commonly-used end mill.

Thought the above Embodiments 1 and 2 describe the end mill 100 having six peripheral cutting edge portions as examples, the present invention is not limited to thereto. For example, end mills each having seven or more peripheral cutting edge portions or five or less peripheral cutting edge portions can be included in the present invention. An end mill 100A among these having four peripheral cutting edge portions is shown in FIG. 4, for example. This end mill 100A has, on the mill body 105 tip side, four peripheral cutting edge portions 107 each also having a peripheral rake face 101, first peripheral flank 102, peripheral cutting edge 103, and second peripheral flank 104. An end mill 100A like this also can reduce the undulation height when the tool abrasion progresses. Further, use of the second peripheral flank 104A (Embodiment 2) instead of the second peripheral flank 104 in the end mill 100A can bring similar effects to Embodiment 2.

The above Embodiments 1 to 3 describe examples in which the first peripheral flank 102 is formed into a flat surface whose cross-sectional shape viewed in the axis V direction is substantially a straight line, but the first peripheral flank 102 of these also can be formed into a curved surface whose cross-sectional shape is a curved line concave toward the inside in the radial direction.

As described above, when each of the first peripheral flank 102 and the second peripheral flank 104A is formed of a concave curved surface, effects equivalent to or more than ones in Embodiment 3 can be obtained.

The invention claimed is:
1. An end mill comprising:
a mill body to be rotated in a rotating direction around an axis; and
a plurality of peripheral cutting edge portions twisted around the axis and formed on a circumference of a tip side of the mill body, the plurality of peripheral cutting edge portions each comprising
a peripheral cutting edge formed into a spiral shape around the axis,
a peripheral rake face on a front of the peripheral cutting edge in the rotating direction and bordering on the peripheral cutting edge, and
a peripheral flank formed on a rear side of the peripheral cutting edge in the rotating direction and bordering on the peripheral cutting edge, wherein
the peripheral flank includes
a first part, which extends from the tip side of the mill body to an end side of the mill body, and
a second part, wherein
the second part is adjacent to the first part and rearward of the peripheral cutting edge in the rotating direction,
the second part is shorter in a longitudinal direction of the peripheral flank than the first part, and the shape of the second part is different from that of the first part.

2. The end mill of claim 1, wherein a minimum value of a width of the first part in the rotating direction is over 0 mm and equal to or under 0.1 mm.

3. The end mill of claim 1, wherein at least one of the first part and the second part is a curved surface, which is concave in a radial direction and curved inwardly in a cross section viewed in an axis direction.

4. A scroll for a scroll compressor, wherein the scroll is processed by the end mill of claim 1.

5. The end mill of claim 1, wherein the second part is one of a plurality of second parts that are spaced apart in a longitudinal direction of the first part.

6. The end mill of claim 1, wherein, when viewed in a cross sectional plane that is perpendicular to an axis of the end mill, a clearance angle of the first part is smaller than a clearance angle of the second part.

* * * * *